July 4, 1933.  C. E. BOHNER  1,916,356
PHASE MULTIPLIER
Filed Feb. 5, 1931  2 Sheets-Sheet 1

INVENTOR
Chance E. Bohner.
BY
Wm. J. Herdman
ATTORNEY

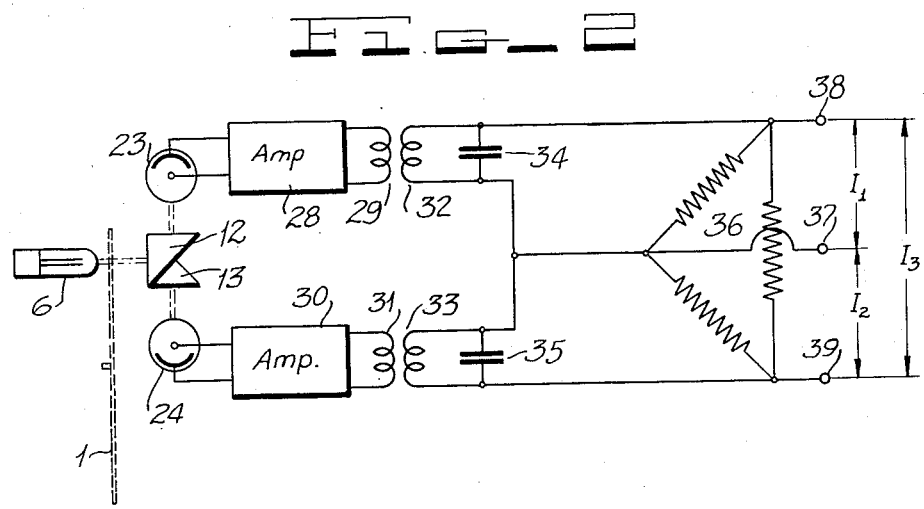
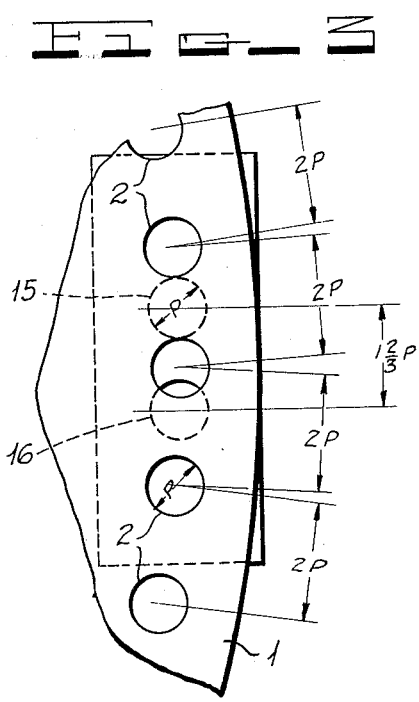
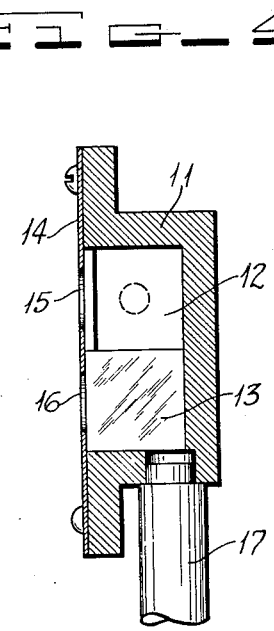
INVENTOR
*Chance E. Bohner.*
BY
*Wm. J. Herdman*
ATTORNEY Patented July 4, 1933

1,916,356

UNITED STATES PATENT OFFICE

CHANCE E. BOHNER, OF EAST ORANGE, NEW JERSEY, ASSIGNOR TO WIRED RADIO, INC., OF NEW YORK, N. Y., A CORPORATION OF DELAWARE

PHASE MULTIPLIER

Application filed February 5, 1931. Serial No. 513,562.

My invention pertains in general to systems for producing polyphase high frequency current and specifically relates to such a system employing light interruption means.

The principal object of my invention consists in providing a simple system for evolving high frequency polyphase current by light pulses incident upon photosensitive means.

A further object consists in producing a phase multiplier system in which a rotating aperture disk is employed to produce light pulses incident upon a plurality of photoelectric cells in polyphase relation.

A still further object comprises producing a phase multiplication system in which three-phase high frequency current is produced by light pulses directed upon a pair of photoelectric cells by a rotating aperture disk.

I accomplish these and other desirable objects in a novel type of phase multiplier employing refractive means for directing light pulses to a plurality of photoelectric cells for producing photoelectric current.

In the drawings accompanying and forming a part of this specification and in which like reference numerals designate corresponding parts throughout:

Fig. 2 is a schematic diagram of my phase multiplier;

Fig. 3 is a detailed view of light intercepting means employed in my invention; and Fig. 4 is a vertical sectional view of a prism housing employed in the apparatus shown in Fig. 1.

Figure 1:
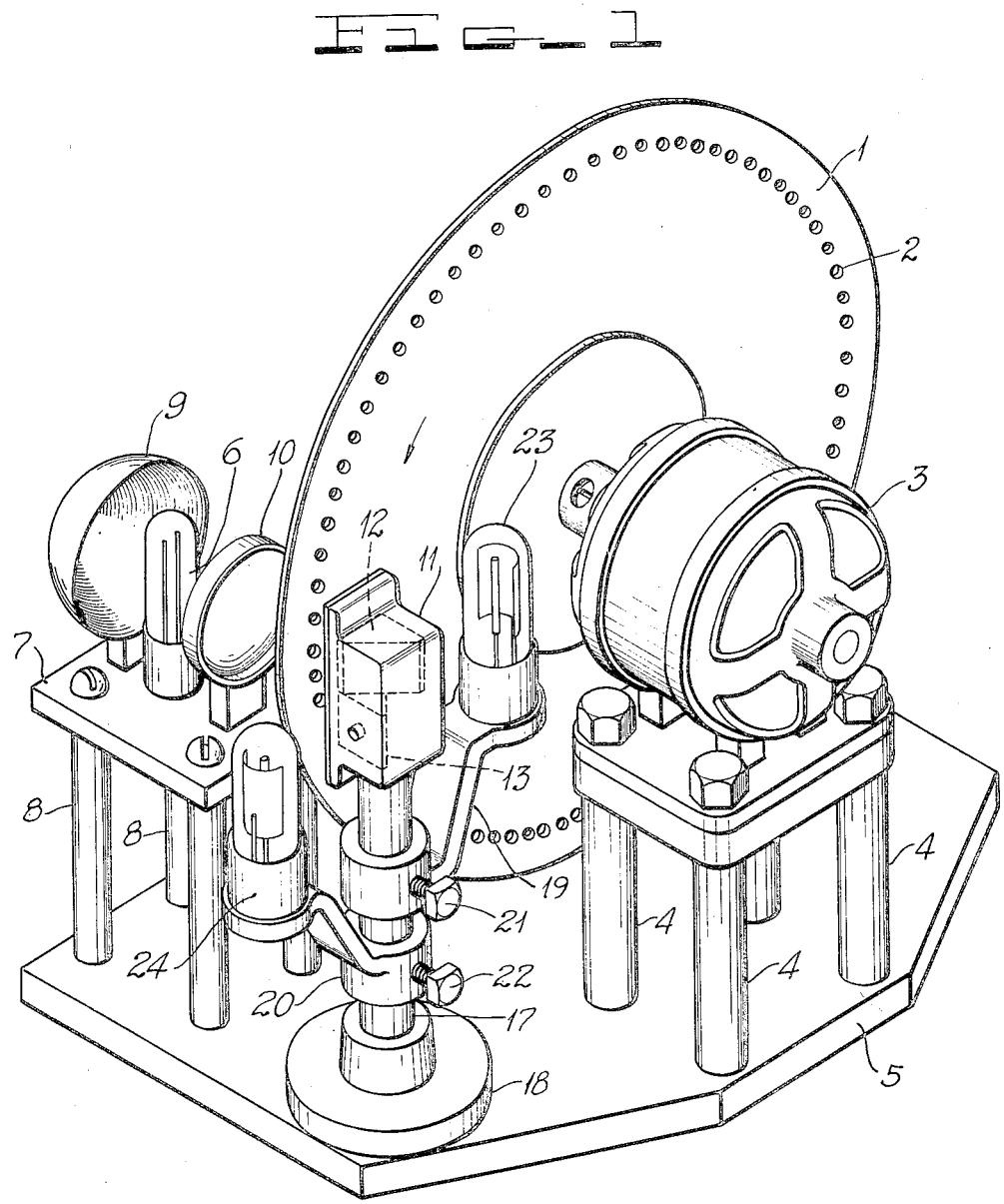
Fig. 1 is a perspective view of one embodiment of the apparatus comprising the phase multiplier of my invention.

Referring to the drawings in detail and particularly to Fig. 1, an opaque disk 1 having an annular series of apertures 2 is mounted upon the armature shaft of an electric motor 3, preferably of the constant speed type. The motor 3 is secured upon standards 4 which are mounted upon a base member 5. A light source comprising a neon lamp 6 is positioned upon a plate 7 mounted upon standards 8 secured to the base member 5. A reflector 9 is positioned behind lamp 6 for directing light rays through a focussing lens 10.

A prism housing 11 is provided upon the opposite side of the disk 2 substantially in alignment with the lamp 6 and lens 10. The housing 11, as shown in Fig. 4, is provided with two right angle prisms 12 and 13 mounted one above the other but turned in opposite directions. An opaque mask 14 is secured to the housing 11 and is provided with two holes 15 and 16 in alignment with the prisms 12 and 13, respectively. The housing 11 is rigidly secured to an upright member 17.

Referring to Fig. 1, the upright member 17 is provided with a supporting member 18 secured to the base member 5. The upright member 17 supports the housing 11 in alignment with the lamp 6 and lens 10. Two bracket members 19 and 20 are slidably positioned upon the upright member 17 and secured with set screws 21 and 22, respectively. The bracket members 19 and 20 support two photoelectric cells 23 and 24 which have their photosensitive cathodes turned toward the prism housing 11. The brackets 19 and 20 are positioned upon the upright member 17 by the set screws 21 and 22 in a manner such that the photoelectric cell 23 is in alignment with the prism 12 while the photoelectric cell 24 is in alignment with the prism 13. An aperture is provided in the housing 11 between the prism 12 and the photoelectric cell 23 and another aperture is provided in the housing 11 between the prism 13 and the photoelectric cell 24. Consequently, a beam of light directed upon the prism 12 from the lamp 6 will be totally reflected to the photoelectric cell 23, while a beam of light incident upon the prism 13 from lamp 6 will be totally reflected to photoelectric cell 24.

Fig. 3 represents in detail the exact arrangement of the apertures in the mask 14 and the disk 1. For a given diameter P of the holes 15 and 16 the spacings between centers of the holes 15 and 16 will be equal to 1⅔ P, as shown. The apertures 2 in the disk 1 will also have a diameter P and will be displaced from each other by chords equal to 2P. By such an arrangement the rotation of the disk 1 will produce photoelectric current impulses in the photoelectric cells 23 and 24, respectively, which will be displaced from each other by 120 electrical degrees.

Fig. 2 illustrates the electrical circuit employed in my phase multiplier. The photoelectric cell 23 is connected through a suitable amplifier 28 to a primary inductance 29 of a radio frequency transformer, while the photoelectric cell 24 is connected through an amplifier 30 to the primary inductance 31 of another radio frequency transformer. The primary inductances 29 and 31 are electromagnetically coupled to secondary inductances 32 and 33, respectively. Capacitances 34 and 35 are connected in parallel with the inductances 32 and 33, respectively, to form resonant circuits which are tuned to the proper high frequencies as developed in the photoelectric cells by the interruption of light by the disk 1. One side of the resonant circuit 32—34 is connected to one side of the resonant circuit 33—35. A connection between these two circuits is provided to a three-phase circuit 36 of the closed delta type, having an output terminal 37. The other side of the resonant circuit 32—34 is connected to the work circuit 36 and terminal 38 while the other side of the resonant circuit 33—35 is connected to the three-phase circuit 36 and terminal 39.

To produce three-phase current according to my system, the disk 1 is rotated at a constant speed such as to produce periodic interruptions of the light from the lamp 6 at high, or super-audible, frequencies. As the disk 1 is rotated, the light passed by each aperture of the series of apertures 2 will be directed into the prisms 12 and 13 in polyphase time relationship as shown in Fig. 3. The photoelectric current impulses set up in the photoelectric cells 23 and 24 and amplified by the amplifiers 28 and 30, respectively, will induce electromotive forces in the inductances 32 and 33. The resonant circuits 32—34 and 33—35 will produce, through the closed delta circuit 36, three-phase current at the terminals 37, 38, and 39. One phase, represented as $I_1$, will be produced across the terminals 38 and 37, while another phase, represented as $I_2$, will be produced across the terminals 37 and 39, and the third phase, represented as $I_3$, will be produced across the terminals 38 and 39.

It will be obvious that the system for phase multiplication according to my invention is extremely efficient in its operation, inasmuch as but one source of light and one series of apertures is employed to produce phase multiplication in a plurality of photoelectric cells. Further, the use of only two photoelectric cells to produce three-phase current from an aperture disk is also especially advantageous. It will, of course, be understood that changes can be made in my system without departing from the intended scope of my invention. Although I have shown a preferred embodiment of my invention I do not, therefore, desire to be limited thereto except insofar as may be pointed out in the appended claims.

What I claim as new and original and desire to secure by Letters Patent of the United States is:

1. A phase multiplier comprising, means for producing a beam of light, means for periodically intercepting said beam of light, a plurality of photoelectric cells, a polyphase circuit interconnecting said photoelectric cells, and means for directing said intercepted beam of light to different ones of said photoelectric cells.

2. A phase multiplier comprising, means for producing a beam of light, means for periodically intercepting said beam of light, a plurality of photoelectric cells, a polyphase circuit interconnecting said photoelectric cells, and refractive means for directing said intercepted beam of light to said photoelectric cells in polyphase time relationship.

3. A phase multiplier comprising, means for producing irradiations, a mask having a series of alternately opaque and transparent portions, means for moving said mask to intercept said irradiations, means for directing said intercepted irradiations to a plurality of different angular directions, and a plurality of photoelectric cells positioned to receive said irradiations, said photoelectric cells being interconnected in polyphase relationship.

4. A phase multiplier comprising, a source of light, a plurality of light directing devices, a light interrupter interposed between said source of light and said devices, a plurality of photoelectric cells each of which is in alignment with one of said light directing devices, and a polyphase circuit interconnecting said photoelectric cells.

5. A phase multiplier comprising, means for producing a beam of light, a plurality of photoelectric cells, a plurality of light reflecting devices each of which is adapted to reflect light upon one of said photoelectric cells, and means for directing said beam of light upon said devices in polyphase time relationship.

6. A phase multiplier comprising, a source of light, a plurality of prisms, an opaque disk having a series of apertures therein and interposed between said source of light and said prisms, a mask interposed between said disc and said prisms and having an aperture therein for each of said prisms, and a plurality of photoelectric cells each of which is in alignment with one of said prisms.

7. A phase multiplier comprising, a source of light, a plurality of prisms, an aperture disc interposed between said source of light and said prisms, and a plurality of photocells interconnected in polyphase relationship for producing polyphase currents under control of said light directed through said prisms by said aperture disc.

8. A phase multiplier comprising, a source of light, a plurality of prisms, an apertured disc interposed between said source of light and said prisms, and a photoelectric cell associated with each of said prisms, and interconnected in polyphase relationship.

CHANCE E. BOHNER.